United States Patent Office 3,636,071
Patented Jan. 18, 1972

3,636,071
ETHERS CONTAINING A HYDROPHEN-
ANTHRENE NUCLEUS
John A. Edwards, Los Altos, Calif., assignor to
Syntex Corporation, Panama, Panama
No Drawing. Filed Oct. 26, 1966, Ser. No. 589,494
Int. Cl. C07c 69/76
U.S. Cl. 260—468.5                 7 Claims

ABSTRACT OF THE DISCLOSURE

Ethers of tetrahydro, hexahydro, and octahydrophenanthrene and derivatives thereof.

This invention relates to novel ethers containing a hydrophenanthrene nucleus and to a method for the preparation thereof. More particularly, this invention relates to novel ethers of tetrahydro, hexahydro and octahydrophenanthrene and derivatives thereof, as represented by the following formulas:

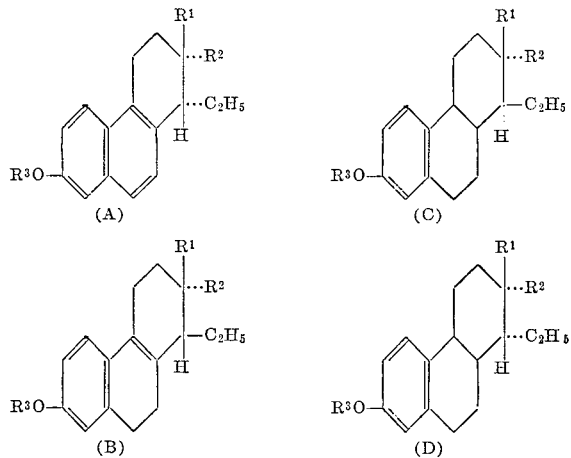

wherein $R^1$ is lower alkyl;
$R^2$ is carboxy, carboalkoxy, cyano, amido, carbothioalkyl, acetyl, formyl, acyloxymethyl, methyl, carbonyl fluoride, carbonyl chloride or methylol; and
$R^3$ is cyclopentyl, tetrahydropyran-2'-yl or tetrahydrofuran-2'-yl.

By the term lower alkyl is meant a straight chain hydrocarbon group containing from one to three carbon atoms, inclusive. By the term carboalkoxy is meant the group —COOR, wherein R is alkyl as defined above. By the term carbothioalkyl is meant the group

wherein R is alkyl as defined above. By the terms, amido, carboxy, carbonyl fluoride and carbonyl chloride is meant the groups,

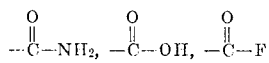

and

respectively. By the term acyloxymethyl is meant the group

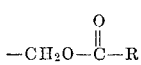

wherein R is a straight or branched chain hydrocarbon group containing from one to six carbon atoms, inclusive.

The novel compounds of Formulas A through D possess hormonal properties characteristic of estrogenic agents and are useful in fertility control and the management of various menstrual conditions such as menopause syndrome. In addition, they also possess hormonal properties characteristic of anti-fertility agents and show a marked separation between these activities, e.g. anti-fertility activity and estrogenic activity. The anti-fertility activity of the tetrahydropyran-2'-yl and tetrahydrofuran-2'-yl compounds of the above formulas is higher while their estrogenic activity is lower than the parent compound. These compounds mainly effect ovum development and/or transport of zygotes in the oviduct. In other words, they are effective anti-fertility agents with low estrogenicity.

The compounds of the present invention are administered via usual routes, i.e. orally or parenterally, in pharmaceautically acceptable compositions at dosage rates of from 0.5γ to 5 mg./kg./day. However, dosage rates below or above this range can also be used; the most favorable dosage rate and administration route being conditioned upon the purpose for which it is administered and the response thereto.

The novel ethers of the present invention are obtained from a corresponding 7-hydroxy containing parent compound as shown in the following sequence:

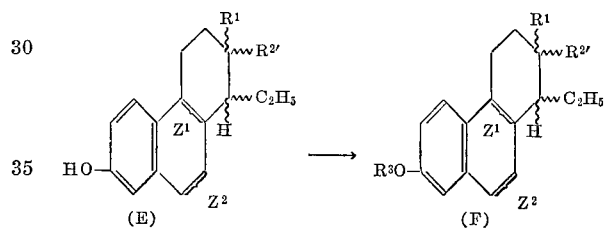

wherein $R^{2'}$ is carboalkoxy, cyano, amido, carbothioalkyl, acetyl, formyl, acyloxymethyl or methyl;
$Z^1$ is a carbon-carbon single bond or a carbon-carbon double bond;
$Z^2$ is a carbon-carbon single bond or a carbon-carbon double bond, $Z^2$ being a single bond when $Z^1$ is a single bond; and
all other substituents are as defined hereinabove.

The wavy line indicates both cis and trans isomers. The free 7-hydroxy containing parent compound of Formula E is converted to the novel 7-ethers by the following etherification procedures.

For the preparation of the cyclopentyl ethers of Formula F of the present invention, the free 7-hydroxy containing parent compound is reacted, under substantially anhydrous conditions, with an alkali metal hydride, such as sodium hydride and the like, and cyclopentyl chloride, bromide or iodide, in an inert solvent such as benzene, xylene, tetrahydrofuran and the like, at a temperature of from 25° C. to the reflux temperature of the solvent, and preferably at the reflux temperature, for from about 1 to about 24 hours. Alternatively, the free 7-hydroxy containing parent compound is reacted with a mild basic reagent such as potassium carbonate, sodium carbonate, and the like, and the cyclopentyl chloride, bromide or iodide in an inert solvent such as acetone, diethyl ketone and the like, at a temperature from about 25° C. to the reflux temperature of the solvent, and preferably at the reflux temperature of the solvent, for from about 1 to about 24 hours.

For the preparation of the tetrahydropyran-2'-yl or tetrahydrofuran-2'-yl ethers of Formula F of the present invention, the free 7-hydroxy containing parent compound is reacted, under substantially anhydrous conditions, with an excess of 2,3-dihydropyran or 2,3-dihydrofuran in the presence of a small amount of an acidic catalyst, such as boron trifluoride etherate, p-toluenesulfonic acid, p-toluenesulfonyl chloride and the like, either alone or together with an inert organic solvent, such as benzene, diethyl ether or the like, at a temperature from about 0° C. to about 50° C. and preferably at 25° C. for from about 30 minutes to about 24 hours.

The thus-obtained novel 7-ethers of Formula F, wherein $R^{2'}$ is carboalkoxy, are used to prepare those novel ethers of the present invention, wherein $R^{2''}$ is carboxy or methylol, as shown in the following sequence:

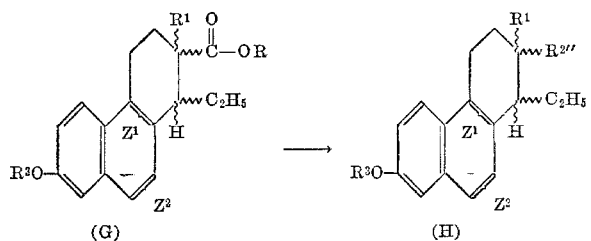

wherein
$R^{2''}$ is carboxy or methylol; and
R, $R^1$, $R^3$, $Z^1$ and $Z^2$ are as defined hereinabove.

For the preparation of the novel 7-ethers of Formula H, wherein $R^{2''}$ is carboxy, the above-formed novel 7-ethers of Formula G are hydrolyzed under basic conditions, such as for example, with sodium or potassium hydroxide in a glycol solvent, such as ethylene glycol and the like, at the reflux temperature of the glycol solvent for a period of about one to about ten hours. Alternatively, the novel 7-ethers of Formula G are hydrolyzed under basic conditions with a five percent by weight alcoholic solution, such as methanol, ethanol and the like, of potassium or sodium hydroxide under pressure, e.g. in a sealed tube, at a temperature of about 150° C. for a period of from one to about ten hours.

For the preparation of the novel 7-ethers of Formula H, wherein $R^{2''}$ is methylol, the above-formed novel 7-ethers of Formula G are reduced by treatment with an alkali metal hydride, such as lithium aluminum hydride and the like, in an inert solvent, such as dioxane, tetrahydrofuran and the like, at a tempeature of from about 25° C. to the reflux temperature of the solvent for from about one to six hours.

The thus-obtained novel 7-ethers of Formula H, wherein $R^{2''}$ is carboxy, are used to prepare those novel ethers of the present invention, wherein $R^{2''}$ is carbonyl chloride or carbonyl fluoride, as shown in the following sequence:

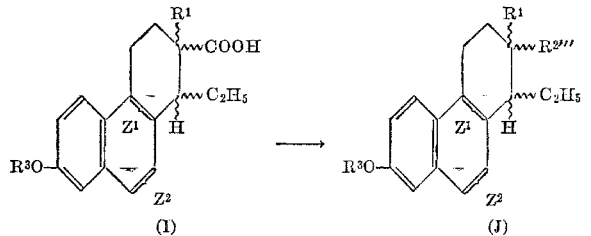

wherein
$R^{2'''}$ is carbonyl chloride or carbonyl fluoride; and
$R^1$, $R^3$, $Z^1$ and $Z^2$ are as defined hereinabove.

For the preparation of the novel 7-ethers of Formula J, wherein $R^{2'''}$ is carbonyl chloride, the above-formed novel 7-ether of Formula I is treated with triphenyl phosphine in carbon tetrachloride at a temperature of about 25° C. for a period of from about 1 to about 12 hours, and preferably at the latter time period. Alternatively, the novel 7-ether of Formula I is allowed to react with thionyl chloride or oxalyl chloride in an inert halogenated solvent, such as methylene chloride, chloroform and the like, at a temperature of about 25° C. for a period of from 1 to 12 hours.

For the preparation of the novel 7-ethers of Formula J, wherein $R^{2'''}$ is carbonyl fluoride, the above-formed novel 7-ether of Formula I is allowed to react with at least a molar equivalent of N-(2-chloro-1,1,2-trifluoroethyl)diethylamine in an inert solvent, such as diethyl ether, acetonitrile, methylene chloride, and the like, at a temperature of from about 0° C. to about 50° C. and preferably at 25° C. for from about one hour to about ten hours, and preferably for five hours.

The starting materials of Formula E are readily prepared by conventional techniques known to those skilled in the art. [See, for example, Helv. Chem. Acta, 28, 1508 (1945) and Helv. Chem. Acta, 30, 70 (1947)].

The following examples are set forth to illustrate but are not intended to limit the scope of the present invention.

EXAMPLE 1

7-cyclopentyl ethers

A solution of one chemical equivalent of dl-cis 1-ethyl-2-methyl-2-carboethoxy-7-hydroxy - 1,2,3,4 - tetrahydrophenanthrene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield dl-cis 1-ethyl-2-methyl-2-carboethoxy - 7 - cyclopentyloxy-1,2,3,4-tetrahydrophenanthrene which is further purified upon recrystallization from pentane.

In a similar manner, utilizing the above procedure, the following starting materials, namely dl-cis 1-ethyl-2-methyl-2-acetoxymthyl-7-hydroxy-1,2,3,4-tetrahydrophenanthrene;
dl-cis 1-ethyl-2-n-propyl-2-carboethoxy-7-hydroxy-1,2,3,4-tetrahydrophenanthrene;
dl-cis 1-ethyl-2-methyl-7-hydroxy-2-carboethoxy-1,2,3,4,9,10-hexahydrophenanthrene;
d-trans 1-ethyl-2-methyl-2-carbomethoxy-7-hydroxy-1,2,3,4,9,10,11,12-octahydrophenanthrene; and
dl-trans 1-ethyl-2-methyl-2-carboethoxy-7-hydroxy-1,2,3,4,9,10,11,12-octahydrophenanthrene;

are converted to the corresponding 7-cyclopentyloxy final products, namely dl-cis 1-ethyl-2-methyl-2-acetoxymethyl-7-cyclopentyloxy-1,2,3,4-tetrahydrophenanthrene;
dl-cis 1-ethyl-2-n-propyl-2-carboethoxy-7-cyclopentyloxyl-1,2,3,4-tetrahydrophenanthrene;
dl-cis 1-ethyl-2-methyl-7-cyclopentyloxy-2-carboethoxy-1,2,3,4,9,10-hexahydrophenanthrene;
d-trans 1-ethyl-2-methyl-2-carbomethoxy-7-cyclopentyl-oxy-1,2,3,4,9,10,11,12-octahydrophenanthrene; and
dl-trans 1-ethyl-2-methyl-2-carboethoxy-7-cyclopentyloxy-1,2,3,4-9,10,11,12-octahydrophenanthrene.

EXAMPLE 2

Tetrahydropyranyl ethers

Two milliliters of dihydropyran are added to a solution of 1 g. of dl-cis 1-ethyl-2-methyl-2-carboethoxy-7-hydroxy-1,2,3,4-tetrahydrophenanthrene in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield dl-cis 1-ethyl-2-methyl-2-carboethoxy-7-(tetrahydropyran - 2' - yloxy)-1,2,3,4-tetrahydrophenanthrene which is recrystallized from pentane.

In a similar manner, using the above procedure, the following starting materials, namely dl-cis 1-ethyl-2-methyl-2-cyano-7-hydroxy-1,2,3,4-tetrahydrophenanthrene;
dl-cis 1-ethyl-2-methyl-2-amido-7-hydroxy-1,2,3,4-tetrahydrophenanthrene;
dl-cis 1-ethyl-2-methyl-2-carbothiomethyl-7-hydroxy-1,2,3,4-tetrahydrophenanthrene;
dl-cis 1-ethyl-2-methyl-2-acetoxymethyl-7-hydroxy-1,2,3,4-tetrahydrophenanthrene;
dl-cis 1-ethyl-2-methyl-2-carboethoxy-7-hydroxy-1,2,3,4,9,10,11,12-octahydrophenanthrene;
d-trans 1-ethyl-2-methyl-2-carboethoxy-7-hydroxy-1,2,3,4,9,10,11,12-octahydrophenanthrene; and dl - cis 1-ethyl-2,2-dimethyl-7-hydroxy-1,2,3,4-tetrahydrophenanthrene; are converted to the corresponding 7-(tetrahydropyran-2'-yloxy) final products, namely
dl-cis 1-ethyl-2-methyl-2-cyano-7-(tetrahydropyran-2'-yloxy)-1,2,3,4-tetrahydrophenanthrene;
dl-cis 1-ethyl-2-methyl-2-amido-7-(tetrahydropyran-2'-yloxy)-1,2,3,4-tetrahydrophenanthrene;
dl-cis 1-ethyl-2-methyl-2-carbothiomethyl-7-(tetrahydropyran-2'-yloxy)-1,2,3,4-tetrahydrophenanthrene;
dl-cis 1-ethyl-2-methyl-2-acetoxymethyl-7-(tetrahydropyran-2'-yloxy)-1,2,3,4-tetrahydrophenanthrene;
dl-cis 1-ethyl-2-methyl-2-carboethoxy-7-(tetrahydropyran-2'-yloxy)-1,2,3,4,9,10,11,12-octahydrophenanthrene;
d-trans 1-ethyl-2-methyl-2-carboethoxy-7-(tetrahydropyran-2'-yloxy)-1,2,3,4,9,10,11,12-octahydrophenanthrene; and
dl-cis 1-ethyl-2,2-dimethyl-7-(tetrahydropyran-2'-yloxy)-1,2,3,4-tetrahydrophenanthrene.

EXAMPLE 3

Tetradrofuranyl ethers

To a solution of 1 g. of dl-cis 1-ethyl-2-methyl-2-carboethoxy-7-hydroxy-1,2,3,4 - tetrahydrophenanthrene in 20 ml. of benzene, is added 20 ml. of dihydrofuran. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate and evaporated to dryness under reduced pressure. The oily residue crystallizes on the addition of ether to yield the dl-cis 1-ethyl-2-methyl-2-carboethoxy-7-(tetrahydrofuran-2'-yloxy)-1,2,3,4-tetrahydrophenanthrene.

In a similar manner, utilizing the above procedure, the following starting materials, namely dl-cis 1-ethyl-2-methyl-2-acetoxymethyl-7-hydroxy-1,2,3,4-tetrahydrophenanthrene;
dl-cis 1-ethyl-2-methyl-2-acetyl-7-hydroxy-1,2,3,4-tetrahydrophenanthrene;
dl-cis 1-ethyl-2-methyl-2-formyl-7-hydroxy 1,2,3,4-tetrahydrophenanthrene;
dl-trans 1-ethyl-2-methyl-2-carbomethoxy-7-hydroxy-1,2,3,4,9,10,11,12-hexahydrophenanthrene; and
d-trans 1-ethyl-2-methyl-2-carboethoxy-7-hydroxy-1,2,3,4,9,10-octahydrophenanthrene; are converted to the corresponding 7-(tetrahydrofuran-2'-yloxy) final products, namely
dl-cis 1-ethyl-2-methyl-2-acetoxymethyl-7-(tetrahydrofuran-2'-yloxy)-1,2,3,4-tetrahydrophenanthrene;
dl-cis 1-ethyl-2-methyl-2-acetyl-7-(tetrahydrofuran-2'-yloxy)-1,2,3,4-tetrahydrophenanthrene;
dl-cis 1-ethyl-2-methyl-2-formyl-7-(tetrahydrofuran-2'-yloxy)-1,2,3,4-tetrahydrophenanthrene;
dl-trans 1-ethyl-2-methyl-2-carbomethoxy-7-(tetrahydrofuran-2'-yloxy)-1,2,3,4,9,10-hexahydrophenanthrene; and
d-trans 1-ethyl-2-methyl-2-carboethoxy-7-(tetrahydrofuran-2'-yloxy)-1,2,3,4,9,10,11,12-octahydrophenanthrene.

EXAMPLE 4

2-phenanthrenecarboxylic acids

A solution of 1 g. of di-cis 1-ethyl-2-methyl-2-carboethoxy - 7-cyclopentyloxy-1,2,3,4-tetrahydrophenanthrene in 50 ml. of ethylene glycol is heated at reflux for three hours with a solution of potassium hydroxide in 1 ml. of water. The reaction mixture is then poured into ice water and the solid which forms is collected by filtration, washed with water to neutrality and dried to yield dl-cis 1-ethyl-2-methyl-7-cyclopentyloxy - 1,2,3,4 - tetrahydro-2-phenanthrenecarboxylic acid which is recrystallized from methylene chloride:ether.

In a similar manner, utilizing the above procedure, the following starting materials, namely dl-cis 1-ethyl-2-methyl-2-carboethoxy-7-(tetrahydrofuran-2'-yloxy)-1,2,3,4-tetrahydrophenanthrene;
dl-cis 1-ethyl-2-methyl-2-carbethoxy-7-(tetrahydro-2'-yloxy-1,2,3,4-tetrahydrophenanthrene;
dl-cis 1-ethyl-2-methyl-2-carboethoxy-7-(tetrahydropyran-2'-yloxy)-1,2,3,4,9,10,11,12-octahydrophenanthrene;
dl-cis 1-ethyl-2-methyl-2-carboethoxy-7-(cyclopentyloxy)-1,2,3,4,9,10-hexahydrophenanthrene; and
d-trans 1-ethyl-2-methyl-2-carboethoxy-7-(tetrahydropyran-2'-yloxy)-1,2,3,4,9,10,11,12-octahydrophenanthrene; are converted to the corresponding 2-carboxylic acid final products, namely
dl-cis 1-ethyl-2-methyl-7-(tetrahydrofuran-2'-yloxy)-1,2,3,4-tetrahydro-2-phenanthrenecarboxylic acid;
dl-cis 1-ethyl-2-methyl-7-(tetrahydropyran-2'-yloxy)-1,2,3,4-tetrahydro-2-phenanthrenecarboxylic acid;
dl-cis 1-ethyl-2-methyl-7-(tetrahydropyran-2'-yloxy)-1,2,3,4,9,10,11,12-octahydro-2-phenanthrenecarboxylic acid;
dl-cis 1-ethyl-2-methyl-7-(cyclopentyloxy)-1,2,3,4,9,10-hexahydro-2-phenanthrenecarboxylic acid; and
d-trans 1-ethyl-2-methyl-7-(tetrahydropyran-2'-yloxy)-1,2,3,4,9,10,11,12-octahydro-2-phenanthrenecarboxylic acid.

EXAMPLE 5

2-phenanthrenecarboxylic acid fluoride

A solution of 1 g. of dl-cis 1-ethyl-2-methyl-7-cyclopentyloxy - 1,2,3,4 - tetrahydro-2-phenanthrenecarboxylic acid in 30 ml. of anhydrous methylene chloride is allowed to react with 1 g. of N-(2-chloro-1,1,2-trifluoroethyl) diethylamine. The reaction mixture is heated under reflux for a period of five hours. The mixture is then poured into ice water, and the product extracted with ether. The extracts are dried and evaporated to dryness to yield the dl-cis 1-ethyl - 2 - methyl-7-cyclopentyloxy-1,2,3,4-tetrahydro-2-phenanthrenecarboxylic acid fluoride which is recrystallized from acetone:hexane.

In a similar manner, using the above procedure, the following materials, namely dl-cis 1-ethyl-2-methyl-7-(tetrahydrofuran-2'-yloxy)-1,2,3,4-tetrahydro-2-phenanthrenecarboxylic acid;
dl-cis 1ethyl-2-methyl-7-(tetrahydropyran-2'-yloxy)-1,2,3,4-tetrahydro-2-phenanthrenecarboxylic acid;
d-trans 1-ethyl-2-methyl-7-(tetrahydropyran-2'-yloxy)-1,2,3,4,9,10,11,12-octahydro-2-phenanthrenecarboxylic acid;

dl-cis 1-ethyl-2-methyl-7-(cyclopentyloxy)-1,2,3,4,9,10,
11,12-octahydro-2-phenanthrenecarboxylic acid; and
dl-cis 1-ethyl-2-methyl-7-(tetrahydrofuran-2'-yloxy)-
1,2,3,4,9,10-hexahydro-2-phenanthrenecarboxylic
acid; are converted to the corresponding 2-acid
fluoride final products, namely dl-cis 1-ethyl-2-methyl-7-(tetrahydrofuran-2'-yloxy)-
1,2,3,4-tetrahydro-2-phenanthrenecarboxylic acid
fluoride;
dl-cis 1-ethyl-2-methyl-7-(tetrahydropyran-2'-yloxy)-
1,2,3,4-tetrahydro-2-phenanthrenecarboxylic acid
fluoride;
d-trans 1-ethyl-2-methyl-7-(tetrahydropyran-2'-yloxy)-
1,2,3,4,9,10,11,12-octahydro-2-phenanthrene-
carboxylic acid fluoride;
dl-cis 1-ethyl-2-methyl-7-(cyclopentyloxy)-1,2,3,4,9,10,
11,12-octahydro-2-phenanthrenecarboxylic acid
fluoride; and dl-cis 1-ethyl-2-methyl-7-(tetrahydrofuran-
2'-yloxy)-1,2,3,4,9,10-hexahydro-2-phenanthrene-
carboxylic acid fluoride.

EXAMPLE 6

2-methylolphenanthrenes

A solution of 1 g. of dl-cis 1-ethyl-2-methyl-2-carbo-
ethoxy - 7 - (tetrahydropyran-2'-yloxy)-1,2,3,4-tetrahy-
drophenanthrene in 50 ml. of tetrahydrofuran is added
over a 30 minute period to a stirred suspension of 1 g.
of lithium aluminum hydride in 50 ml. of anhydrous
tetrahydrofuran and this mixture is heated at reflux for
two hours. To the mixture are cautiously added 5 ml. of
ethyl acetate and 2 ml. of water. Sodium sulfate is next
added, the mixture is filtered and the solid thus collected
is washed with hot ethyl acetate. The combined organic
solutions are then evaporated to yield dl-cis 1-ethyl-2-
methyl - 2 - methylol-7-(tetrahydropyran-2-yloxy) - 1,2-
3,4-tetrahydrophenanthrene which may be further purified
through recrystallization from acetone:hexane.

In a similar manner, using the above procedure, namely
dl-cis 1-ethyl-2-methyl-2-carboethoxy-7-(cyclopentyloxy)-
1,2,3,4-tetrahydrophenanthrene; and
dl-cis 1-ethyl-2-methyl-2-carboethoxy-7-(tetrahydrofuran-
2'-yloxy)-1,2,3,4-tetrahydrophenanthrene; are
converted to the corresponding 2-methylol final
products, namely
dl-cis 1-ethyl-2-methyl-2-methylol-7-(cyclopentyloxy)-
1,2,3,4-tetrahydrophenanthrene; and
dl-cis 1-ethyl-2-methyl-2-methylol-7-(tetrahydrofuran-
2'-yloxy)-1,2,3,4-tetrahydrophenanthrene.

EXAMPLE 7

2-phenanthrenecarboxylic acid chloride

A solution of 1 g. of dl-cis 1-ethyl-2-methyl-7-cyclo-
pentyloxy-1,2,3,4-tetrahydro - 2 - phenanthrenecarboxylic
acid in 20 ml. of carbon tetrachloride is allowed to react
with 2 g. of triphenylphosphine. The reaction mixture is
held at 25° C. for a period of twelve hours. The mixture
is then poured into ice water, filtered and the product is
extracted with ether. The extracts are dried and evaporated
to dryness to yield dl-cis 1-ethyl-2-methyl-7-cyclopentyl-
oxy - 1,2,3,4 - tetrahydro-2-phenanthrenecarboxylic acid
chloride which is purified by chromatography over florisil
and recrystallized from acetone:hexane.

In a similar manner, using the above procedure, namely dl-cis 1-ethyl-2-methyl-7-,tetrahydrofuran-2'-yloxy)-
1,2,3,4-tetrahydro-2-phenanthrenecarboxylic acid;
dl-cis 1-ethyl-2-methyl-7-(tetrahydropyran-2'-yloxy)-
1,2,3,4-tetrahydro-2-phenanthrenecarboxylic acid;
d-trans 1-ethyl-2-methyl-7-(tetrahydropyran-2'-yloxy)-
1,2,3,4,9,10,11,12-octahydro-2-phenanthrenecarboxylic
acid;
dl-cis 1ethyl-2-methyl-7-(cyclopentyloxy)-1,2,3,4,9,10,
11,12-octahydro-2-phenanthrenecarbovxylic acid; and
dl-cis 1-ethyl-2-methyl-7-(tetrahydrofuran-2'-yloxy)-
1,2,3,4,9,10-hexahydro-2-phenanthrenecarboxylic acid;
are converted to the following acid chloride final
products, namely dl-cis 1-ethyl-2-methyl-7-(tetrahydrofuran-2'-yloxy)-1,2,
3,4-tetrahydro-2-phenanthrenecarboxylic acid chloride;
dl-cis 1-ethyl-2-methyl-7-(tetrahydrofuran-2'-yloxy)-
1,2,3,4-tetrahydro-2-phenanthrenecarboxylic acid
chloride;
d-trans 1-ethyl-2-methyl-7-(tetrahydropyran-2'-yloxy)-
1,2,3,4,9,10,11,12-octahydro-2-phenanthrenecarboxylic
acid chloride;
dl-cis 1-ethyl-2-methyl-7-(cyclopentyloxy)-1,2,3,4,9,10,11,
12-octahydro-2-phenanthrenecarboxylic acid chloride;
and
dl-cis 1-ethyl-2-methyl-7-(tetrahydropyran-2'-yloxy)-
1,2,3,4,9,10-hexahydro-2-phenanthrenecarboxylic acid
chloride.

What is claimed is:
1. A compound according to the following formulas:

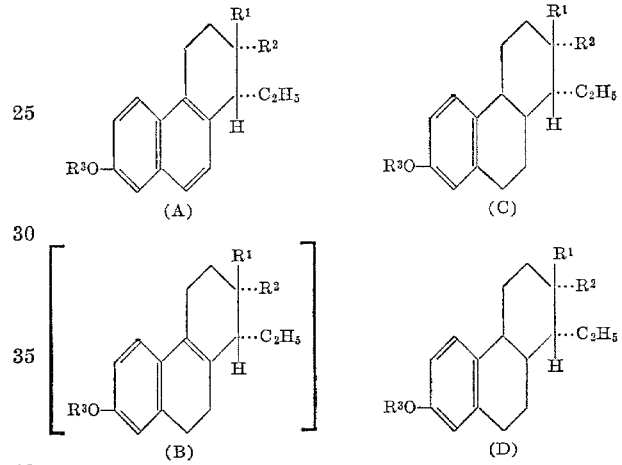

wherein
$R^1$ is lower alkyl of one to three carbon atoms;
$R^2$ is carboxy, —COOR wherein R is alkyl of one to
three carbon atoms; and
$R^3$ is cyclopentyl.

2. A compound according to Formula A of claim 1
wherein $R^1$ is methyl; $R^2$ is carboxy.

3. A compound according to Formula D of claim 1
wherein $R^1$ is methyl; $R^2$ is carboxy.

4. A compound according to Formula A of claim 1
wherein $R^1$ is methyl and $R^2$ is —COOR wherein R is
ethyl.

5. A compound according to Formula A of claim 1
wherein $R^1$ is n-propyl and $R^2$ is —COOR wherein R is
ethyl.

6. A compound according to Formula D of claim 1
wherein $R^1$ is methyl and $R^2$ is —COOR wherein R is
methyl.

7. A compound according to Formula D of claim 1
wherein $R^1$ is methyl and $R^2$ is —COOR wherein R is
ethyl.

References Cited

UNITED STATES PATENTS 2,687,426   8/1954   Hogg _____ 260—514.5 X

LORRAINE A. WEINBERGER, Primary Examiner

P. J. KILLOS, Assistant Examiner

U.S. Cl. X.R.

260—345.7, 345.8, 345.9, 347.3, 347.4, 347.8, 455 C,
465 F, 488 CD, 514.5, 544 F, 544 M, 559 R, 586 H, 600,
612 R, 613 R; 424—308 DIG 12

PA-234

UNITED STATES PATENT OFFICE
CERTIFICATE OF CORRECTION

Patent No. 3,636,071                    Dated January 18, 1972

Inventor(s) John A. Edwards

It is certified that error appears in the above-identified patent and that said Letters Patent are hereby corrected as shown below:

Column 4, line 18, "70" should be -- 780 --.
Column 4, line 42, "-2-acetoxymthyl-" should be -- 2-acetoxymethyl- --.
Column 4, line 58, "oxyl-" should be -- oxy- --.
Column 5, line 70, "1,2,3,4,9,10,11,12-hexahydrophenanthrene; and" should be -- 1,2,3,4,9,10-hexahydrophenanthrene; and --.
Column 6, line 30, "-2-carbethoxy-7-" should be -- -2-carboethoxy-7- --.
Column 7, line 36, "(tetrahydropyran-2-yloxy)-" should be -- (tetrahydropyran-2'-yloxy)- --.
Column 8, Claim 1, formula B, in brackets, should be omitted.
Column 8, Claim 1, formula C should appear as follows:

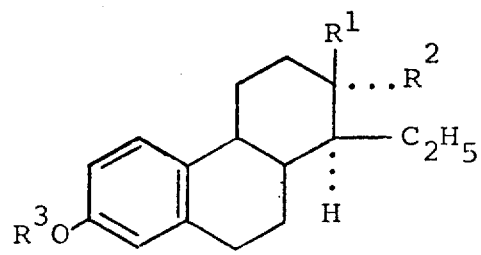

(C)

Signed and sealed this 5th day of September 1972.

(SEAL)
Attest:

EDWARD M. FLETCHER, JR.                ROBERT GOTTSCHALK
Attesting Officer                      Commissioner of Patents